(12) United States Patent
Legge

(10) Patent No.: US 9,373,929 B2
(45) Date of Patent: Jun. 21, 2016

(54) Q-SWITCHED LASER SYSTEM AND METHOD TO PREVENT SEEDING FROM PRE-LASING

(75) Inventor: David Legge, Crewe Toll (GB)

(73) Assignee: SELEX ES LTD, Essex (GB)

(*) Notice: Subject to any disclaimer, the term of this patent is extended or adjusted under 35 U.S.C. 154(b) by 707 days.

(21) Appl. No.: 11/629,516

(22) PCT Filed: Oct. 18, 2006

(86) PCT No.: PCT/GB2006/050336
§ 371 (c)(1),
(2), (4) Date: Dec. 14, 2006

(87) PCT Pub. No.: WO2007/054737
PCT Pub. Date: May 18, 2007

(65) Prior Publication Data
US 2008/0291947 A1    Nov. 27, 2008

(30) Foreign Application Priority Data

Nov. 14, 2005  (EP) ..................................... 05270080
Nov. 14, 2005  (GB) .................................. 0523128.7

(51) Int. Cl.
| | | |
|---|---|---|
| H01S 3/11 | (2006.01) |
| H01S 3/08 | (2006.01) |
| H01S 3/094 | (2006.01) |
| H01S 3/0941 | (2006.01) |
| H01S 3/10 | (2006.01) |
| H01S 3/16 | (2006.01) |

(52) U.S. Cl.
CPC ................. *H01S 3/11* (2013.01); *H01S 3/0804* (2013.01); *H01S 3/0941* (2013.01); *H01S 3/094076* (2013.01); *H01S 3/10038* (2013.01); *H01S 3/1611* (2013.01); *H01S 3/1643* (2013.01)

(58) Field of Classification Search
CPC ............................. H01S 3/11; H01S 3/094076
See application file for complete search history.

(56) References Cited

U.S. PATENT DOCUMENTS

| 3,577,097 | A | | 5/1971 | Hilberg |
| 3,711,791 | A | | 1/1973 | Erickson |
| 5,355,383 | A | * | 10/1994 | Lockard ..................... 372/38.03 |
| 6,038,241 | A | * | 3/2000 | von Elm et al. .................. 372/30 |

FOREIGN PATENT DOCUMENTS

| GB | 2 149 199 A | 6/1985 |
| JP | 2000-049407 A | 2/2000 |

OTHER PUBLICATIONS

Georgiou et al., "50 mJ/30 ns FTIR Q-switched diode-pumped Er:Yb:glass 1.54 μm laser", Oct. 15, 2001, Elsevier, Optics Communications 198, 147-153.*

(Continued)

*Primary Examiner* — Joshua King
(74) *Attorney, Agent, or Firm* — Buchanan Ingersoll & Rooney PC

(57) ABSTRACT

A method for preventing spatial or spectral beam seeding in a Q-switched laser is described. The Q-switch trigger of the laser is delayed by several laser resonator lifetimes after the end of the pump pulse. In this way, beam seeding is completely eliminated whilst pre-lase is maintained. The method described may be used for any laser system where the fall time of the pump radiation is sufficiently fast with respect to the upper state lifetime of the laser medium.

5 Claims, 2 Drawing Sheets

(56) References Cited

OTHER PUBLICATIONS

Figure 1:
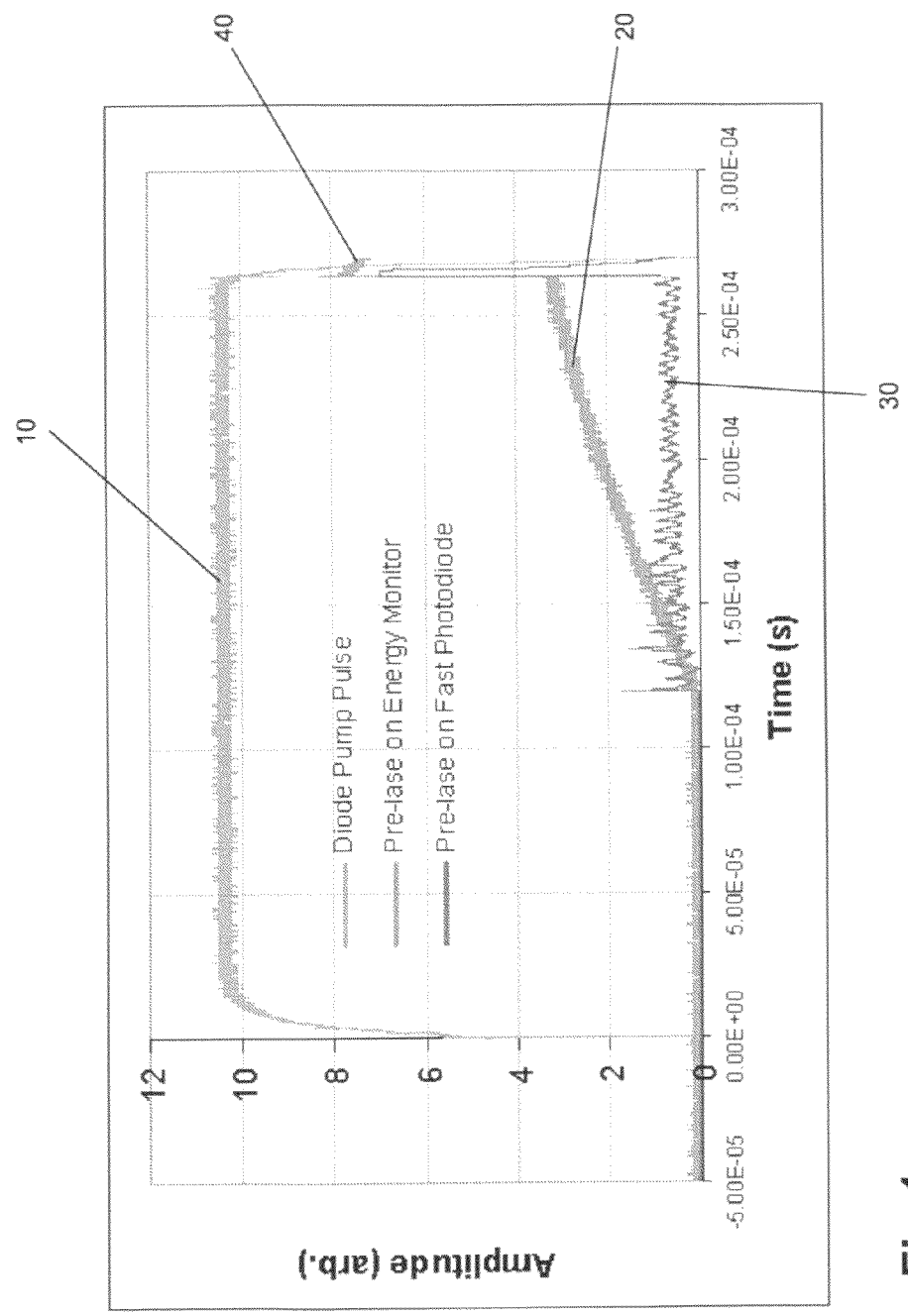

Georgiou et al., "High-Efficiency and High-Output Pulse Energy Performance of a Diode-Pumped Er:Yb:Glass 1.54-μm Laser," 2000, Appl. Phys. B, 70, 755-762.*

"Radiation Lifetime in a Cavity," Sep. 5, 2001, http://hyperphysics.phy-astr.gsu.edu/hbase/optmod/lascav.html, 1-4.*

Norman P. Barnes et al., "A Self-Injection Locked, Q-Switched, Line-Narrowed Ti:Al$_2$O$_3$ Laser", IEEE Journal of Quantum Electronics, Jun. 1988, pp. 1021-1028, vol. 24, No. 6 (cited in United Kingdom Search Report).

Efstratios Georgiou et al., "50mJ/30 ns FTIR Q-Switched Diode-Pumped Er:Yb:Glass 1.54 μm Laser", Optics Communications, Oct. 15, 2001, pp. 147-153, vol. 198, Elsevier (cited in European Search Report).

Wenjie Xie, et al., "Fluorescence Feedback Control of an Active Q-Switched Diode-Pumped Nd:YVO$_4$ Laser", Applied Physics, Feb. 20, 2000, pp. 978-981, vol. 39, No. 6, XP-0009283335 (cited in European Search Report).

Maris Ozolinsh et al., "2.79 μm Erbium Laser With Lead-Lanthanum Zirconate Titanate Ceramics Electro-Optic Q-Switching Output Coupler", Applied Physics Letters, Jul. 31, 2000, pp. 615-617, vol. 77, No. 5 (cited in European Search Report).

United Kingdom Search Report dated Feb. 17, 2006.

European Search Report dated Mar. 10, 2006.

Teich et al., "Resonator Optics", Fundamentals of Photonics, Chapter 9, 1991, pp. 310-341.

Extended European Search Report issued in corresponding European Application No. 15020020.2 dated Feb. 3, 2016.

Setzler, et al., "Resonantly Pumped Eyesafe Erbium Lasers", IEEE Journal of Selected Topics in Quantum Electronics, May/Jun. 2005, vol. II, No. 3, pp. 645-657.

* cited by examiner

Q-SWITCHED LASER SYSTEM AND METHOD TO PREVENT SEEDING FROM PRE-LASING

The invention relates generally to laser arrangements and methods. More specifically, but not exclusively it relates to a Q-switched laser resistant to beam seeding, whilst retaining pre-lase characteristics, and a method of achieving the same.

In any Q-switched laser there is a possibility that a very small amount of continuous wave (CW) or quasi-continuous wave (QCW) laser radiation is emitted prior to the main Q-switch pulse. This is termed pre-lase.

This can be forced to occur, for example, by permitting some leakage through the Q-switch itself. This is normally used for spectral seeding of single frequency lasers to finely control output frequency within the Q-switch pulse.

Pre-lase can also happen by accident, if the resonator is not "closed" enough or when a parasitic resonator is formed from reflective surfaces outside the laser. This may occur in very high gain systems where hold-off is difficult to maintain. One of the unfortunate side-effects is that, particularly when the high gain laser is multi-transverse mode, serious spatial (as well as spectral) seeding occurs, causing the beam to fragment and often become excessively "peaky". This is termed spatial beam seeding.

The fragmentation and excessive peaking of the laser beam resulting from the spatial beam seeding can cause damage to sensitive optics in the system. This is because the peak power density can significantly increase as a result of the spatial beam seeding associated with the pre-lase.

The standard method in which to prevent spatial beam seeding, and hence protect the sensitive optics of the system, is to try to prevent pre-lase occurring at all. This can be accomplished by under-pumping the laser, or by attempting to detect conditions pre-requisite to the onset of pre-lase. Under-pumping the laser reduces output energy, whilst detection of pre-lase is rarely achievable in practice.

The invention described below aims to overcome these disadvantages and produce a Q-switched laser not susceptible to spatial beam seeding, whilst not eliminating pre-lase.

In accordance with one aspect of the present invention, there is provided a method of preventing spatial or spectral beam seeding in a pumped Q-switch laser, comprising the step of delaying the Q-switch trigger by an integer number of laser resonator lifetimes after the end of the pump pulse, such that pre-lase does not result in the onset of beam seeding.

In accordance with another aspect of the present invention, there is provided a method of preventing spatial or spectral beam seeding in a laser comprising the step of delaying the initial pulse of energy to the laser by an integer number of laser resonator lifetimes after the end of the pump pulse, such that pre-lase does not result in the onset of beam seeding.

In accordance with a further aspect of the present invention, there is provided a laser system comprising a diode laser for pumping using a defined pump pulse, a trigger for triggering the pumped pulse and control means for delaying the trigger by an integer number of laser resonator lifetimes after the end of the pump pulse, such that pre-lase does not result in the onset of beam seeding.

Accordingly, the laser in question can be designed much closer to the damage threshold of the optics, either in the laser itself or in associated systems, completely eliminating the risk that pre-lase will cause the dramatic increase in peak power density associated with spatial seeding. This therefore prevents catastrophic damage to optical coatings and/or substrates, and also permits removal of pre-lase detectors from laser systems thereby simplifying the optics of the system.

The invention will now be described with reference to the accompanying diagrammatic drawings in which:—

Figure 2:
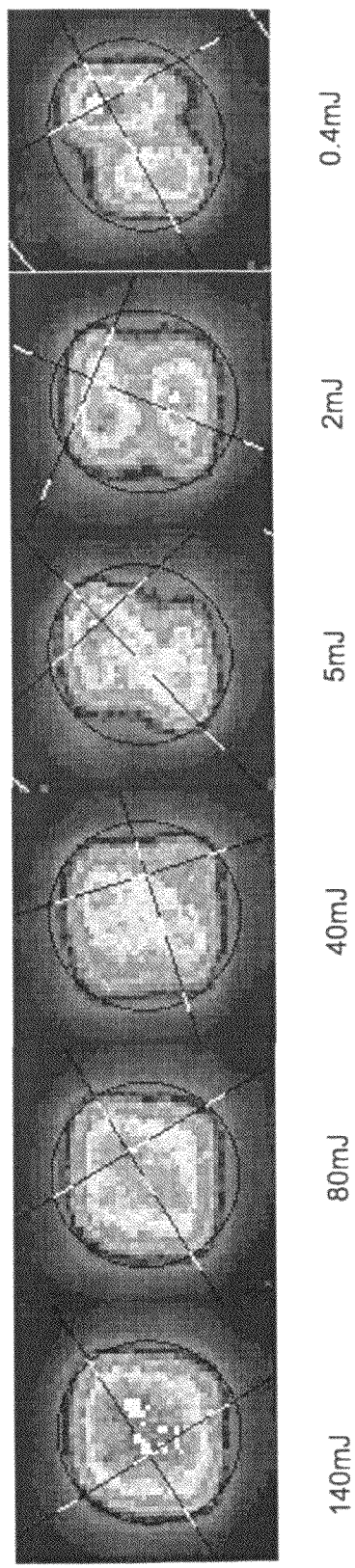

FIG. 1 shows the typical timing of pump, pre-lase and Q-Switch outputs for optimised output energy, in accordance with one form of the invention; and FIG. 2 shows the beam seeding fragmentation caused by varying amounts of pre-lase energy showing that the worst effects are for the smallest amounts of pre-lase energy.

In a Q-switched laser system, when pumping the laser using a defined pump pulse, from say a diode laser, the timing of the Q-switch relative to the pump pulse is normally chosen to maximise the output energy, or optimise the output pulse duration. In this configuration, a pre-lase event will cause spatial beam seeding to occur.

Seeding of the main Q-switch output pulse can be completely eliminated by delaying the Q-switch trigger by at least several laser resonator lifetimes (typically 10 to 20 ns) after the end of the pump pulse. Indeed, by delaying the Q-switch by up to 1% of the active laser medium spontaneous emission lifetime (230 μs for Nd:YAG) after the end of the pump pulse, spatial seeding can be completely eliminated, no matter how much pre-lase is present, for almost no loss in final output power/energy.

This happens because CW/QCW laser oscillation will die away very quickly once the pump level dies below threshold. There is therefore nothing present to seed the beam spatially or spectrally. The timing and effect of pre-lase using a typical Q-switch trigger can clearly be seen in FIG. 1.

In FIG. 1, the diode pump pulse is indicated by reference numeral 10. Numerals 20 and 30 indicate the pre-lase on energy monitor and fast photodiode respectively. The Q-Switch output is indicated by reference numeral 40.

In the situation described above, the pre-lase energy would cause beam seeding, as indicated in FIG. 2. By delaying the Q-switch timing by an additional 4 to 5 μs on the above trace, all beam seeding is eliminated whilst in the presence of the illustrated level of pre-lase.

By delaying the Q-Switch pulse in the manner described above all the transverse beam profiles shown in FIG. 2 look homogeneous and similar to that shown for the 140 mJ case.

Preferably when in use, and to obtain the maximum benefit of this technique, a short pump pulse fall time of less than or equal to 2% of lasing medium upper state lifetime is required. Additionally, a Q-switch firing delay of an additional 1% of lasing medium upper state lifetime subsequent to the fall of the pump pulse is preferable. Furthermore, the Q-switch firing point must be for pump pulse levels at least below the threshold level, preferably with no pump present at all.

It will be appreciated that the technique has been developed with application to diode pumped solid-state Q-switched lasers in general, however it can be used for any such laser where the fall time of the pump radiation is sufficiently fast with respect to the upper state lifetime of the laser medium.

The invention claimed is:

1. A method of preventing at least one of spatial and spectral beam seeding in a pumped Q-switch laser without pre-lase detection, the method comprising:
    pumping the laser with a pump pulse; and
    delaying a triggering of the Q-switch by an integer number of laser resonator lifetimes after an end of an emitted pump pulse, wherein the integer number of laser resonator lifetimes includes a period during which oscillation of a continuous wave or quasi-continuous wave (CW/QCW) laser dies,
    wherein the pump pulse fall time is less than or equal to 2% of the lasing medium upper state lifetime, and wherein the delay of the Q-switch is up to 1% of an upper state lifetime of the lasing medium subsequent to the fall of the pump pulse to eliminate spatial beam seeding plus an additional delay of 4 to 5 μs to eliminate both spatial and spectral beam seeding.

2. The method of preventing spatial or spectral beam seeding according to claim 1, wherein the delay of the Q-switch up to 1% of the upper state lifetime of the lasing medium subsequent to the fall of the pump pulse is 10 to 20 ns after the end of the pump pulse.

3. A method of preventing at least one of spatial and spectral beam seeding in a laser, the method comprising the step of:

delaying an initial pulse of energy to the laser by an integer number of laser resonator lifetimes after an end of an emitted pump pulse, wherein the integer number of laser resonator lifetimes includes a period during which oscillation of a continuous wave or quasi continuous wave (CW/QCW) laser dies, wherein the pump pulse fall time is less than or equal to 2% of the lasing medium upper state lifetime, and wherein the delay of the Q-switch is up to 1% of an upper state lifetime of the lasing medium subsequent to the fall of the pump pulse to eliminate spatial beam seeding plus an additional delay of 4 to 5 μs to eliminate both spatial and spectral beam seeding.

4. A laser system comprising:

a diode laser for generating a pump pulse in a laser cavity;

a Q-switch trigger for emitting laser radiation from the laser cavity based on the pumped pulse; and control means for delaying the Q-switch trigger by an integer number of laser resonator lifetimes after the end of the pumped pulse from which the laser radiation is emitted, wherein the integer number of laser resonator lifetimes includes a period during which oscillation of a continuous wave or quasi continuous wave (CW/QCW) laser dies, wherein the pump pulse fall time is less than or equal to 2% of the lasing medium upper state lifetime, and wherein the delay of the Q-switch is up to 1% of an upper state lifetime of the lasing medium subsequent to the fall of the pump pulse to eliminate spatial beam seeding plus an additional delay of 4 to 5 μs to eliminate both spatial and spectral beam seeding.

5. The laser system according to claim 4, wherein the delay of the Q-switch up to 1% of the upper state lifetime of the lasing medium subsequent to the fall of the pump pulse is 10 to 20 ns after the end of the pump pulse.

* * * * *